US011085415B1

(12) United States Patent
Menges

(10) Patent No.: US 11,085,415 B1
(45) Date of Patent: Aug. 10, 2021

(54) WIND GENERATOR SYSTEM HAVING A BIOMIMETIC AERODYNAMIC ELEMENT FOR USE IN IMPROVING THE EFFICIENCY OF THE SYSTEM

(71) Applicant: Star Sailor Energy, Inc., Cincinnati, OH (US)

(72) Inventor: Pamela A. Menges, Cincinnati, OH (US)

(73) Assignee: STAR SAILOR ENERGY, INC., Cincinnati, OH (US)

( * ) Notice: Subject to any disclaimer, the term of this patent is extended or adjusted under 35 U.S.C. 154(b) by 0 days.

(21) Appl. No.: 16/896,746

(22) Filed: Jun. 9, 2020

Related U.S. Application Data

(63) Continuation-in-part of application No. 16/225,428, filed on Dec. 19, 2018, now abandoned.

(60) Provisional application No. 62/708,792, filed on Dec. 22, 2017.

(51) Int. Cl.
*F03D 3/06* (2006.01)
*F03D 9/25* (2016.01)
*F03D 3/00* (2006.01)

(52) U.S. Cl.
CPC .............. *F03D 3/062* (2013.01); *F03D 3/005* (2013.01); *F03D 9/25* (2016.05)

(58) Field of Classification Search
CPC ............. F03D 3/005; F03D 3/062; F03D 9/25
USPC ........................... 290/44, 52, 55; 415/4.1–4.5
See application file for complete search history.

(56) References Cited

U.S. PATENT DOCUMENTS

| 222,256 A | 12/1879 | Dewees |
| 632,740 A * | 9/1899 | Parker ................... B64C 27/463 416/228 |
| 692,714 A | 2/1902 | Sala et al. |
| 2,230,526 A | 2/1941 | Claytor |
| 2,252,788 A | 8/1941 | Sparr |
| 3,042,371 A | 7/1962 | Fanti |
| 3,426,214 A | 2/1969 | O'Malley |
| 3,621,930 A | 11/1971 | Dutchak |
| 3,877,836 A | 4/1975 | Tompkins |

(Continued)

FOREIGN PATENT DOCUMENTS

| DE | 40 39 203 A1 | 2/1992 |
| DE | 43 22 058 A1 | 2/1994 |

(Continued)

OTHER PUBLICATIONS

USPTO Office Action dated Dec. 10, 2019 for U.S. Appl. No. 16/225,428.

*Primary Examiner* — Pedro J Cuevas
(74) *Attorney, Agent, or Firm* — Mark F. Smith; Smith Bradenburg Ltd

(57) ABSTRACT

The present invention is a wind generator system for small wind applications that harnesses low velocity wind effectively, the wind generator system comprising a rotor, a drive shaft connected to the rotor and to a generator for converting mechanical energy into electrical energy; and a plurality of blades attached to the rotor and extending radially outwardly therefrom; wherein each blade includes a first portion having a distal end for attaching to the rotor and a proximal end attached to a scoop portion with individual scoop sections; and wherein each individual scoop section has an angle of incidence to the wind that operates to increase the lift of the blade while decreasing drag.

17 Claims, 16 Drawing Sheets

(56) References Cited

U.S. PATENT DOCUMENTS

| | | | | |
|---|---|---|---|---|
| 3,995,170 | A | 11/1976 | Graybill | |
| 4,015,911 | A | 4/1977 | Darvishian | |
| 4,030,298 | A | 6/1977 | Sandoval | |
| 4,039,849 | A | 8/1977 | Mater et al. | |
| 4,084,918 | A | 4/1978 | Pavlecka | |
| 4,109,465 | A | 8/1978 | Plen | |
| 4,111,601 | A | 9/1978 | Deberg | |
| 4,191,507 | A | 3/1980 | DeBerg | |
| 4,242,628 | A | 12/1980 | Mohan et al. | |
| 4,289,444 | A | 9/1981 | Monk et al. | |
| 4,329,593 | A | 5/1982 | Willmouth | |
| 4,408,958 | A * | 10/1983 | Schacle | F03D 1/0641 416/237 |
| 4,543,042 | A | 9/1985 | Lange | |
| 4,630,997 | A | 12/1986 | Cousteau et al. | |
| 4,697,761 | A | 10/1987 | Long | |
| 4,722,665 | A | 2/1988 | Tyson | |
| D300,932 | S | 5/1989 | Sikes | |
| 5,075,564 | A | 12/1991 | Hickey | |
| 5,140,170 | A | 8/1992 | Henderson | |
| 5,246,342 | A | 9/1993 | Bergstein | |
| 5,326,225 | A * | 7/1994 | Gallivan | F04D 29/164 416/169 A |
| 5,333,996 | A | 8/1994 | Bergstein | |
| 5,336,933 | A | 8/1994 | Emster | |
| 5,463,257 | A | 10/1995 | Yea | |
| 5,570,859 | A | 11/1996 | Quandt | |
| 5,572,816 | A | 11/1996 | Anderson, Jr. et al. | |
| 5,800,123 | A | 9/1998 | Trevor | |
| 6,138,956 | A | 10/2000 | Monner | |
| 6,164,599 | A | 12/2000 | Piening et al. | |
| 6,242,818 | B1 | 6/2001 | Smedley | |
| 6,302,778 | B1 | 10/2001 | Andrews | |
| 6,382,904 | B1 | 5/2002 | Orlov et al. | |
| 6,419,187 | B1 | 7/2002 | Buter et al. | |
| 6,465,902 | B1 | 10/2002 | Beauchamp et al. | |
| 6,638,005 | B2 | 7/2003 | Holter et al. | |
| 6,717,284 | B2 | 4/2004 | Lin | |
| 6,724,097 | B1 | 4/2004 | Wobben | |
| 6,765,309 | B2 | 7/2004 | Tallal, Jr. et al. | |
| 6,781,284 | B1 | 8/2004 | Peirine et al. | |
| 6,808,366 | B2 | 10/2004 | Sikes | |
| 6,809,432 | B1 | 10/2004 | Bilgen | |
| 6,850,821 | B2 | 2/2005 | Weitkamp | |
| 6,870,280 | B2 | 3/2005 | Pechler | |
| 6,908,287 | B2 * | 6/2005 | Cho | F04D 29/326 415/119 |
| 6,925,385 | B2 | 8/2005 | Ghosh et al. | |
| 6,952,058 | B2 | 10/2005 | McColn | |
| 6,966,758 | B2 | 11/2005 | Grabau et al. | |
| 6,984,899 | B1 | 1/2006 | Rice | |
| 7,008,171 | B1 | 3/2006 | Whitworth | |
| 7,045,702 | B2 | 5/2006 | Kashyap | |
| 7,121,807 | B2 * | 10/2006 | Cho | F04D 29/384 416/242 |
| 7,215,037 | B2 | 5/2007 | Scalzi | |
| 7,230,348 | B2 | 5/2007 | Poole | |
| 7,242,108 | B1 | 7/2007 | Dable | |
| 7,287,954 | B2 | 10/2007 | Kinkaid | |
| 7,323,791 | B2 | 1/2008 | Jonsson | |
| 7,453,168 | B2 | 11/2008 | Lanie | |
| 7,585,155 | B2 * | 9/2009 | Park | F04D 29/326 416/189 |
| 7,758,299 | B1 | 7/2010 | Jarecki | |
| 7,775,760 | B1 | 8/2010 | Finnell | |
| 7,880,323 | B2 | 2/2011 | Menges | |
| 7,896,608 | B2 | 3/2011 | Whitworth | |
| D638,358 | S | 5/2011 | Sauer | |
| 8,193,657 | B2 | 6/2012 | Paluszek | |
| 8,241,000 | B2 | 8/2012 | Blanton | |
| 8,258,645 | B2 | 9/2012 | Barber | |
| 8,282,339 | B2 | 10/2012 | Sankar | |
| 8,288,884 | B1 | 10/2012 | Malcolm | |
| 8,303,250 | B2 | 11/2012 | Mohammed | |
| 8,338,973 | B2 | 12/2012 | Suzuki | |
| 8,421,260 | B2 | 4/2013 | Duke | |
| 8,450,872 | B2 | 5/2013 | Richard | |
| 8,506,248 | B2 | 8/2013 | Wilson | |
| 8,529,211 | B2 | 9/2013 | Blanton | |
| 8,648,481 | B2 | 2/2014 | Menges | |
| 8,747,067 | B2 * | 6/2014 | Barban | F03D 1/0633 416/11 |
| 8,864,440 | B2 | 10/2014 | Sauer | |
| 8,905,704 | B2 | 12/2014 | Sauer | |
| 9,278,744 | B1 | 3/2016 | Bailey | |
| 9,309,863 | B2 | 4/2016 | Foss | |
| 9,366,228 | B2 | 6/2016 | Menges | |
| 9,464,621 | B2 * | 10/2016 | Barban | F03D 1/0675 |
| 9,482,204 | B2 | 11/2016 | Plourde | |
| 9,494,137 | B2 | 11/2016 | Hwang | |
| 9,562,511 | B2 | 2/2017 | Kaste | |
| 9,841,032 | B2 * | 12/2017 | Henner | F04D 29/384 |
| 9,890,761 | B2 | 2/2018 | Kasten | |
| 9,970,453 | B2 * | 5/2018 | Henner | F04D 29/384 |
| 10,094,361 | B2 | 10/2018 | Bardia | |
| 10,288,036 | B2 * | 5/2019 | Liu | F03B 3/12 |
| 10,408,192 | B2 | 9/2019 | Gonzalez | |
| 10,697,467 | B2 * | 6/2020 | Froh | F04D 29/384 |
| 2001/0048089 | A1 | 12/2001 | Clark et al. | |
| 2003/0133782 | A1 | 7/2003 | Holter et al. | |
| 2003/0175109 | A1 | 9/2003 | Brock et al. | |
| 2003/0218337 | A1 | 11/2003 | Lin | |
| 2004/0100103 | A1 | 5/2004 | Becherocci et al. | |
| 2004/0160059 | A1 | 8/2004 | Pandian | |
| 2004/0230377 | A1 | 11/2004 | Ghosh et al. | |
| 2006/0056972 | A1 | 3/2006 | DeLong | |
| 2007/0077145 | A1 | 4/2007 | Kinkaid | |
| 2007/0284885 | A1 | 12/2007 | Menges | |
| 2008/0079263 | A1 | 4/2008 | Morharia et al. | |
| 2010/0266407 | A1 | 10/2010 | Barber | |
| 2010/0316500 | A1 | 12/2010 | Blanton | |
| 2011/0095531 | A1 | 4/2011 | Menges | |
| 2011/0148117 | A1 | 6/2011 | Huang | |
| 2012/0121416 | A1 | 5/2012 | Sauer | |
| 2012/0301301 | A1 | 11/2012 | Sauer | |
| 2012/0301310 | A1 | 11/2012 | Blanton | |
| 2014/0159368 | A1 | 6/2014 | Menges | |
| 2015/0104312 | A1 * | 4/2015 | Barban | F03D 1/0633 416/11 |
| 2015/0204300 | A1 | 7/2015 | Kasten | |
| 2015/0316025 | A1 | 11/2015 | Enevoldsen | |
| 2016/0084223 | A1 | 3/2016 | Gonzalez | |
| 2016/0312769 | A1 | 10/2016 | Menges | |
| 2017/0089322 | A1 * | 3/2017 | Liu | F03B 3/121 |
| 2018/0156198 | A1 | 6/2018 | Menges | |
| 2018/0372069 | A1 | 12/2018 | Church | |
| 2019/0360465 | A1 | 11/2019 | Moore | |

FOREIGN PATENT DOCUMENTS

| | | |
|---|---|---|
| DE | 195 30 253 A1 | 11/1996 |
| DE | 196 23 055 A1 | 1/1997 |
| DE | 100 10 258 A1 | 6/2001 |
| FR | 2267652 | 11/1975 |
| FR | 2899651 A1 | 4/2006 |
| GB | 2 072 756 A | 10/1981 |
| JP | 411125171 A | 5/1999 |
| JP | 02000161196 A | 6/2000 |
| WO | WO 2006/123951 A1 | 11/2006 |
| WO | WO 2007/126704 A3 | 11/2007 |

* cited by examiner

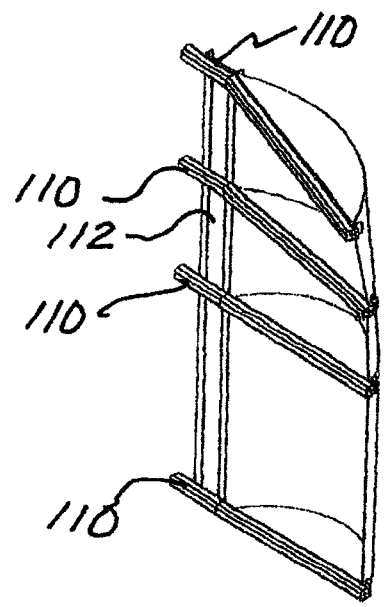
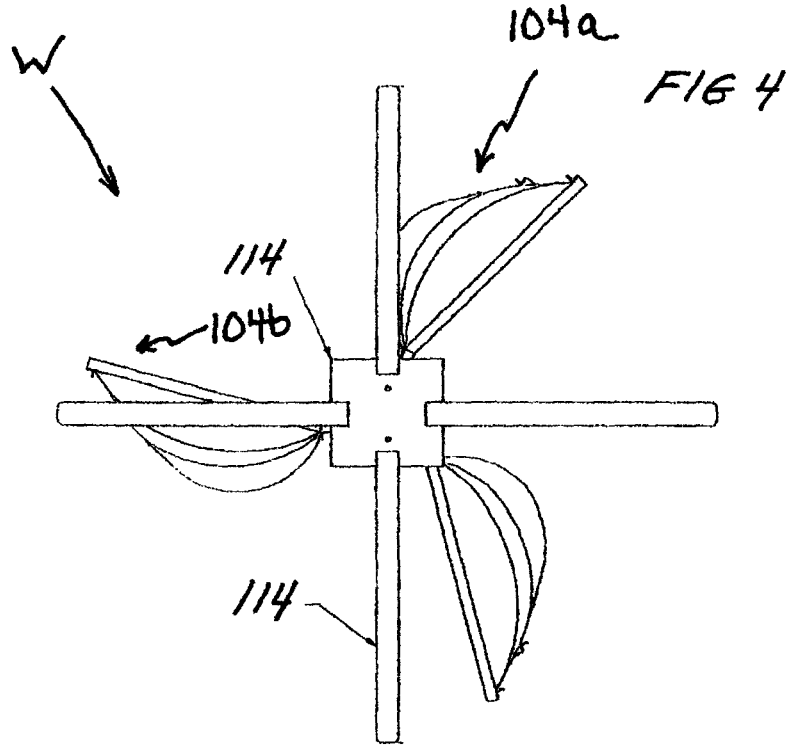

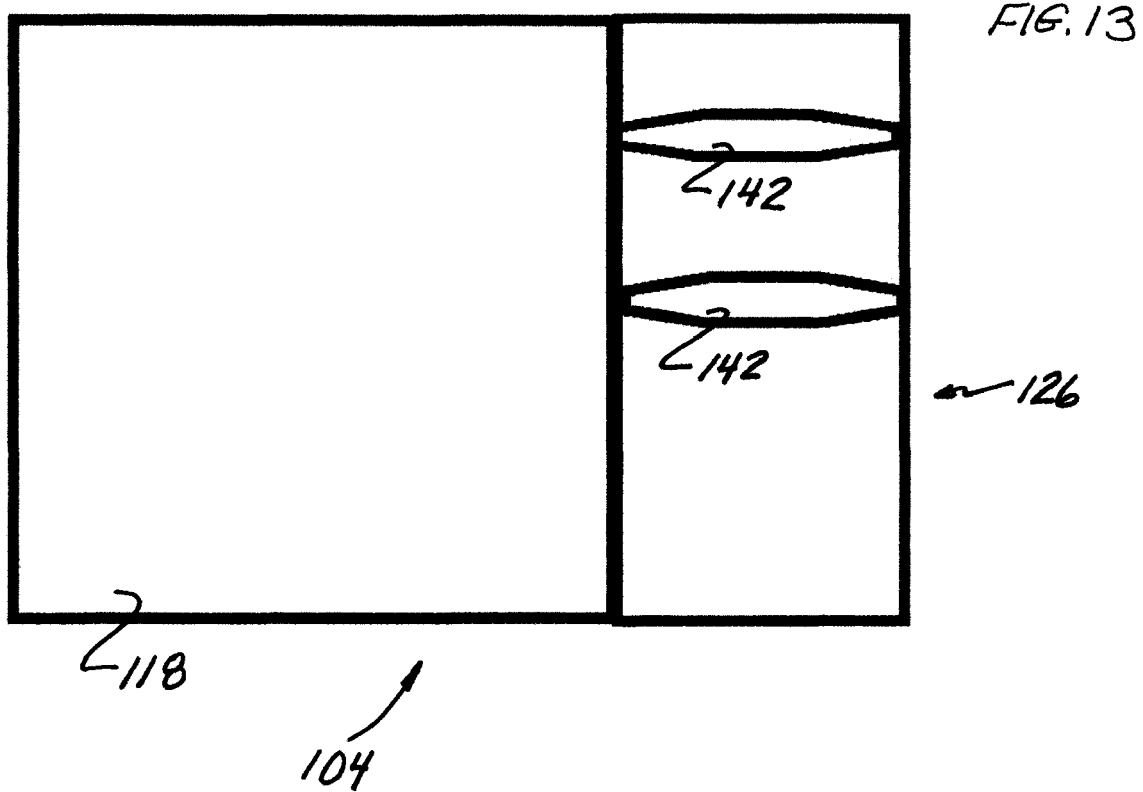

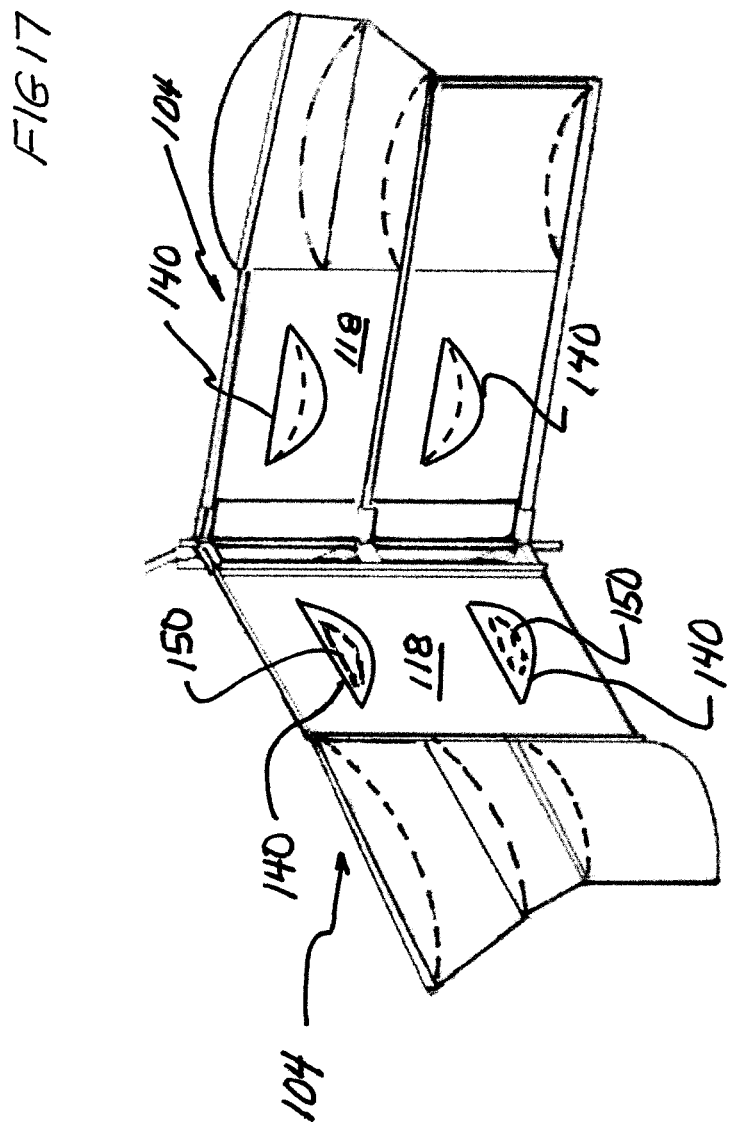

WIND GENERATOR SYSTEM HAVING A BIOMIMETIC AERODYNAMIC ELEMENT FOR USE IN IMPROVING THE EFFICIENCY OF THE SYSTEM

CROSS-REFERENCE TO PRIOR APPLICATION

This application claims benefit to and incorporates herein in its entirety U.S. Provisional Patent Application No. 62/708,792, filed in the U.S. Patent and Trademark Office on Dec. 22, 2017 and is a Continuation-In-Part of U.S. patent application Ser. No. 16/225,428 filed Dec. 19, 2018 which is incorporated herein.

TECHNICAL FIELD

The present invention is directed to a wind generator system having a biomimetic aerodynamic element for use in improving the efficiency of the wind generator system.

BACKGROUND OF THE INVENTION

In recent years the need for alternative sources of electrical energy has grown significantly as a result of increased and uncertainty in oil prices, environmental concerns, and the lack of sufficient alternative energy supplies. Accordingly, wind generator systems have gained support as an alternate energy source. Wind generator systems have been shown to provide a safe and clean source of electric power. Systems, such as large or big wind generator systems, have been developed having large blades (often more that 18 feet in length) mounted on high towers that can produce more than 35 kilowatts (kW) of power with wind speeds of 20 knots. Such systems are typically used in combination with other wind generator systems, such as along coastal areas for providing electrical power directly to power grids and have also been used in rural areas, such as farms, for providing supplemental power or reducing electrical costs.

Small wind generator systems mounted on smaller towers have been developed for use such as for residential application and have been used as remote or distributed power sources. Such systems are often connected to the main electric service to the home thereby allowing sufficient powering of the home and for sending excess power generated by the wind generator back to the power grid. Typically, theses small wind generators systems have blades that rotate at speeds that vary with wind speed and are connected to a rotor coupled to a gearbox that operates to increase the rotation speed of a generator producing electric power.

In operation, wind generator systems operate by converting kinetic energy of the wind into rotational energy of the rotor and drive shaft which is then converted into electrical energy by a generator coupled to the drive shaft. Accordingly, a primary objective in wind generator design is to maximize aerodynamic efficiency (the efficiency that power is obtained from the wind) of the system. This aerodynamic efficiency, such as the efficiency of the bladed hub or rotor, is dependent on a number of variables which include the number of blade attached to the hub, the shape and orientation of the blades, the pitch angle of the blades, and the length of the blades.

The theoretical maximum power efficiency of any type of a wind turbine operating in an open atmosphere is $Ce=0.59$ (fifty-nine percent) or the Betz Limit. However, current propeller or horizontal wind axis turbines are considerably lower at 0.32-0.45 (thirty-two percent to forty-five percent) with only ten to thirty percent of the power of the wind actually converted into usable electricity by horizontal axis wind turbines (HAWT). Both types of vertical axis wind turbines (Darius and Savonius) offer 0.18-0.28 (eighteen percent to twenty-eight percent). This is not necessarily an issue in that the majority of HAWT's are used within utility operated wind farms whereby the generated electricity is subject to an 80% (eighty percent) during transmission. Whereas vertical axis wind turbines (VAWT) are used locally whereby their efficiencies are not as a significant issue.

In the last decade several studies have determined that the grouping of VAWTs of either Darius or Savonius type will provide improvement of efficiencies. These groupings are based on vortex generation observed in schooling fish. Such vortices may be optimized through the placement of the VAWT's or VAWT towers. These VAWT wind farms or smaller wind gardens offer efficiencies higher than that of HAWT towers with greater reliability.

In developing designs for other aerodynamic components, such as aircraft wings, birds have often been studied and numerous fixed and variable airfoil profiles have been developed that were inspired by birds in an attempt to optimize lift while minimizing drag. While large birds and birds of prey have wing structures such as hooks and twists to increase lift over a broad range of airspeeds efficiently, such aerodynamic structures have not been effectively utilized in structures such as wind generator systems.

Accordingly, it would be desirable to have a wind generator system having a plurality of rotating blades, wherein each blade has improved lift and drag characteristics over prior art blades, that do not significantly increase the cost of the wind generator system or decreases the reliability of the system, that is acoustically and aesthetically acceptable for residential operation, and which is relatively inexpensive to manufacture and install.

SUMMARY OF THE INVENTION

The present invention is a new and novel wind generator system having one or more blades each having a biomimetic aerodynamic element that operates to harness wind energy effectively. In a preferred embodiment of the invention, the biomimetic aerodynamic element comprises a rotor having a plurality of blades attached to the rotor and extending radially outwardly therefrom. Each blade includes a first portion having a distal end for attaching to the rotor and a proximal end attached to a scoop portion with individual scoop sections each individual scoop section having an angle of incidence to the wind that increases the lift of the blade (increasing the rotational force on the rotor) while decreasing drag.

In another preferred embodiment of the invention wherein the angle of incidence of each scoop section is varied to create a hook and a twist along the scoop portion.

In another preferred embodiment of the invention the wind generator system operates to convert wind energy into electrical energy, the system having at least one rotor and at least one blade attached to the rotor and extending radially outwardly therefrom. Each blade includes a first portion having distal end for attaching to the rotor and a proximal end attached to a scoop portion, wherein the scoop portion includes individual scoop sections each having an angle of incidence to the wind that increases the lift of the blade (increasing the rotational force on the rotor) while decreasing drag.

In another preferred embodiment of the invention the wind generator system operates to convert energy from wind into mechanical energy for operating a mechanical system.

In another preferred embodiment of the invention wherein each individual blade of the wind generator system comprises an aerodynamic adjustment element for adjusting the aerodynamic characteristic of the blade.

In another preferred embodiment of the invention each individual blade of the wind generator system comprises an aerodynamic adjustment element for adjusting the aerodynamic characteristic of scoop portion the blade.

In a preferred embodiment of the invention the aerodynamic element is a thin film material.

In another preferred embodiment of the invention the aerodynamic element is a metallic composite coating.

In another preferred embodiment of the invention the aerodynamic element is formed from a shaped memory material or a functional material.

In another preferred embodiment of the invention the shaped memory alloy is Nitinol.

These and other features, aspects, and advantages of the present invention will become better understood with regard to the following description, appended claims, and accompanying drawings.

BRIEF DESCRIPTION OF THE DRAWINGS

To provide a more complete understanding of the present invention and further features and advantages thereof, reference is now made to the following description taken in conjunction with the accompanying drawings, in which:

FIG. 3 is a perspective view of a blade of FIG. 2 showing the blade having a vertical support for supporting horizontal arms of the rotor that support the blade, the blade having a scoop portion with individual scoop sections that form a hook and twist along the scoop portion;

FIG. 4 is a top schematic plan view of the wind generator having a frame for supporting the rotor and various blades (a retreating blade and an advancing blade) attached to the rotor;

FIG. 13 is a schematic illustration showing a scoop portion having aerodynamic flaps that operate to increase the lift component (torque) of the blade;

FIG. 17 is a perspective schematic view showing a rotor having supporting horizontal arms for supporting a plurality of blades, each blade having a first portion and a scoop portion with scoop sections, the rotor is shown having a vertical support and horizontal arms that support the individual blades and wherein the first portion of each blade having an adjusting aerodynamic lift apparatus that closes to increase lift (torque) when the blade is a retreating blade and opens to allow air to pass through the blade to decrease drag when the blade is an advancing blade;

BEST MODE FOR CARRYING OUT THE INVENTION

Figure 1:
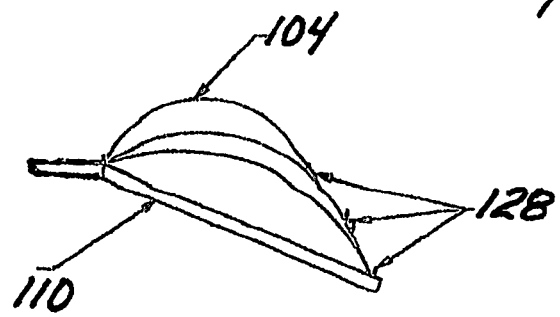
FIG. 1 is a schematic perspective illustration of a blade having a scoop portion and attached to a rotor of the wind generator system of the subject invention showing a horizontal arm of a rotor for supporting the blade.

The present invention relates to low or small wind generator systems. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. As used herein the terms "upper" or "upwardly" refer to the direction away from the ground. The terms "lower" or "downwardly" refer to the direction towards the ground. The term "ground" refers to the surface that the wind generator system is resting on, such as the earth, or a support structure.

The present invention is a new and novel wind generator system having one or more vertical axis blades that utilize a biomimetic aerodynamic elements, such as angular system of scoops, that creates a geometry similar to that of a raptor wing where the wing from the terminal root at the fercular junction radiating to the wing tip whose feathers induce a hook. It is this hook geometry that is translated to the geometry of this novel scoop design. The leading-edge slat in avian wings functions as a spoiler as it operates to increase lift. This avian leading-edge slat does not cover the entire leading edge and creates a hook in raptors that provides a high-lift component at high-angles of attack where the avian wing structure is nearly equivalent to the rotor of the subject invention. Further, the slotted design of the scoops imitates the slotted wingtips common to soaring birds and operate to improve lift and to reduce induced drag. It has been found that such wings reveal novel passive aerodynamic mechanisms reducing flow separation and improved capture of all wind components. Further, the biomimetic system of the subject invention creates an aerodynamic system that functions to optimize lift over a range of wind velocities while reducing drag on the rear of the rotors in rotation as the blades advance to the center line of the wind. The center line of air flow over the novel biomimetic blades is the axis or center shaft. The fixed geometry and passive structure of the rotors of the subject invention operates to reduce the requirement for moving components and effectively captures the lift component while reducing drag thereby exploiting the structural reliability of a vertical axis wind generator of Savonius type while improving lift and decreasing drag. It will be understood that when forces and velocities are at equilibrium, the subject invention optimizes the scoop angles which are inclined forward and the scoops and scoop angles exhibit lift and drag that are parallel and perpendicular to the rotors. Prior to reaching equilibrium of wind velocity, the lift on the upper scoop, just as with a raptor wing hook, is predominately vertical and produces significant improvement over a flat Savonius scoop.

The idea of increasing lift in a vertical axis wing generator or turbine (VAWT) is not itself new. Devices have been developed including ducting and composite rotors. While these devices do have some impact on lift, the increased complexity of the designs create complex and expensive manufacturing and maintenance procedures and ultimately decrease reliability making them unsuitable for many applications. The subject invention provides a new and novel design for VAWTs that reduces drag while maintaining reliability and simplicity in manufacturing. The ability to maintain simplicity in rotor design in VAWTs cannot be overstated, as their reliability and simplicity of manufacture and operation are critical to their application. The novel design of the subject application maintains these characteristics and offers significant advantages in performance and operations.

All aerodynamic surfaces have vertical and horizontal lift components. Exploiting the horizontal lift component in a VAWT rotor of the subject invention results un reducing drag on the advancing blade while increasing lift at the receding blade. This also induces a vortex in a three or more plurality of blades thereby decreasing the stagnation pressures to the rear of the rotors and at equilibrium and at higher wind speed it also creates a vacuum effect on the blunt rear skinned area of the rotor thereby increasing efficiency further. In the teachings of avian wing anatomy and geometry, it is observed that certain species, such as raptors, induce a hook like structure at the upper tip of the out wing which is referred to as a hook. This hook has several analogies in aerodynamics and aerodynamic control surfaces. The most common type of high-lift devices is a flap. One type of flap is a split flap, which is utilized in the subject invention, which operates to increase lift area of the inner rotor scoop or trough and limits vortices in the captured airflow. As many VAWTs depend on turbulent boundary layers, this in a novel aspect of the subject invention and operates to increase efficiency without the common brute force methodology. High-lift aerodynamic devices, such as flaps, operate by changing the geometries of aerodynamic surfaces through changes in camber or curvature of lifting surfaces such as wings and rotors. These devices specifically change the primary air stream facing elements of wings and rotors on the leading and trailing edges as well as the tips and roots. For the nearly slab sided Savonius wind turbine rotor and devices that provide the greatest lift improvements are those that allow for a novel geometry in the capture and direction of air flow or wind and the force imparted to the rotor. It will be clear that another novel element of the subject invention is the use of a single disk or plate attached to the top of the rotor frames. The use of such a disk or plate operates to increase the effectiveness of the flap and slat type lifting devices and functions as a lifting device itself. The disk or plate also operates to reduce weight of rotor frames and acts as a wind guest support thereby preventing buckling of the rotor frame or spiders thereby increasing reliability. Further, in a preferred embodiment of the subject invention, the rotor is a vertical rotor with a skin or web that directs the wind into the scoop or trough at the outer region of the rotor. In another preferred embodiment of the invention, the scoop or trough includes a fixed aerodynamic high-lift device, such as a slat or flap, that operates to capture the wind and redirects it to the upper scoop or trough area thereby increasing horizontal lift on the rotor. In another preferred embodiment of the invention, the rotor includes a flat skinned or webbed area connecting the rotor frame root with the outer scoop or trough. This flat area includes slotted areas that increases airflow on advancing blades through mechanical flaps reducing drag. In another preferred embodiment of the invention, the web or flat skin area of the rotors include slotted devices that employ a ridge in the slot flap that supports reduction in turbulence on the face of the rotor skin or eb region and redirects the air flow to the scoop or trough thereby improving capture within the high-lift portion of the rotor.

Figure 2:
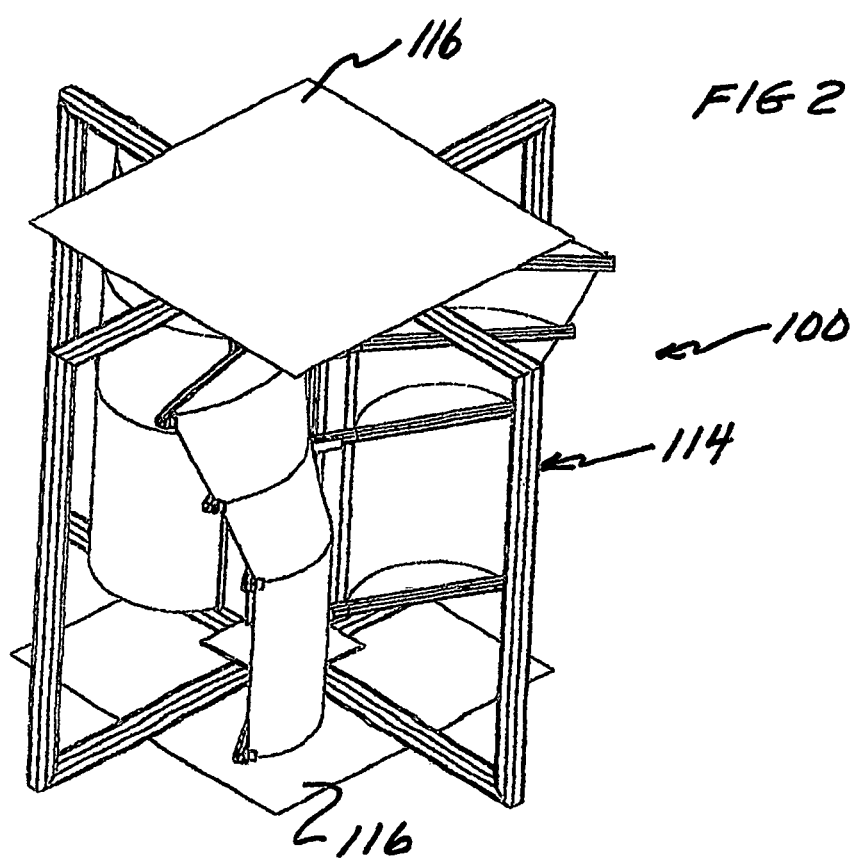
FIG. 2 is a perspective schematic illustration of the wind generator system showing blades mounted to a rotor, each blade having a biomimetic aerodynamic element in the form of a scoop portion having individual scoop sections that operate to change the angle of incidence of the wind along the scoop portion.
Figure 5:
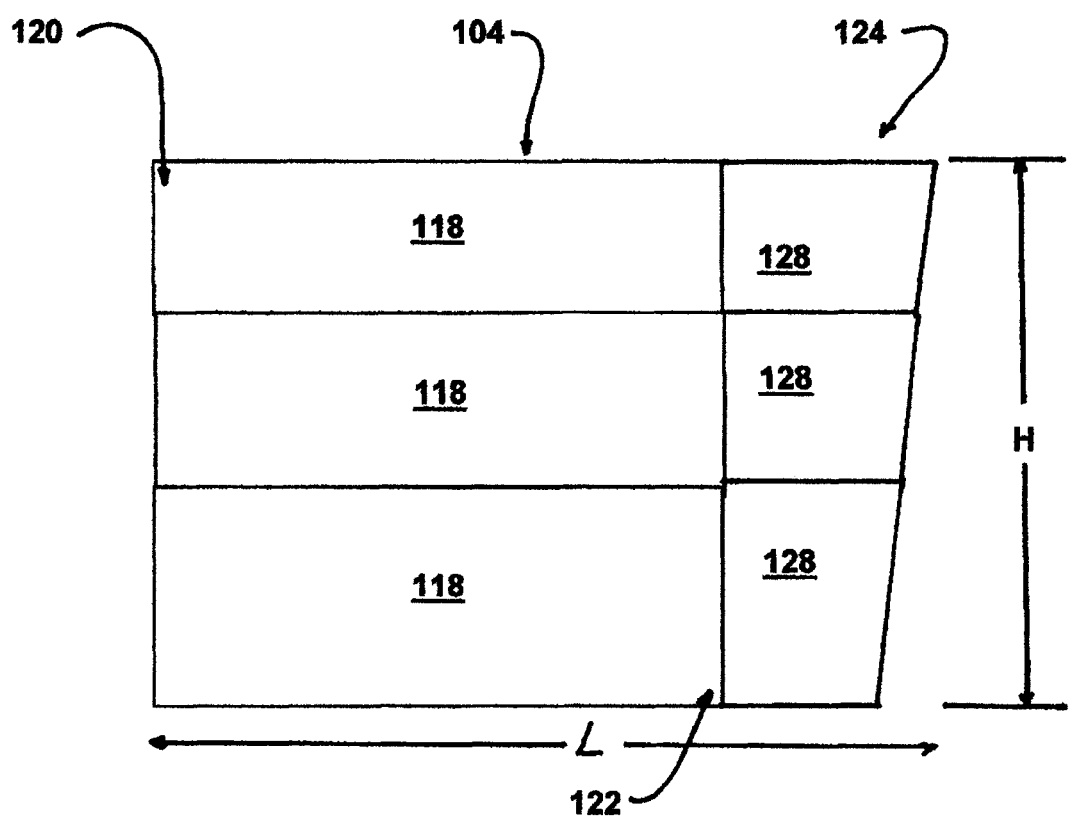
FIG. 5 is a side schematic view illustration showing a blade having a first portion and a scoop portion with scoop sections.
Figure 6:
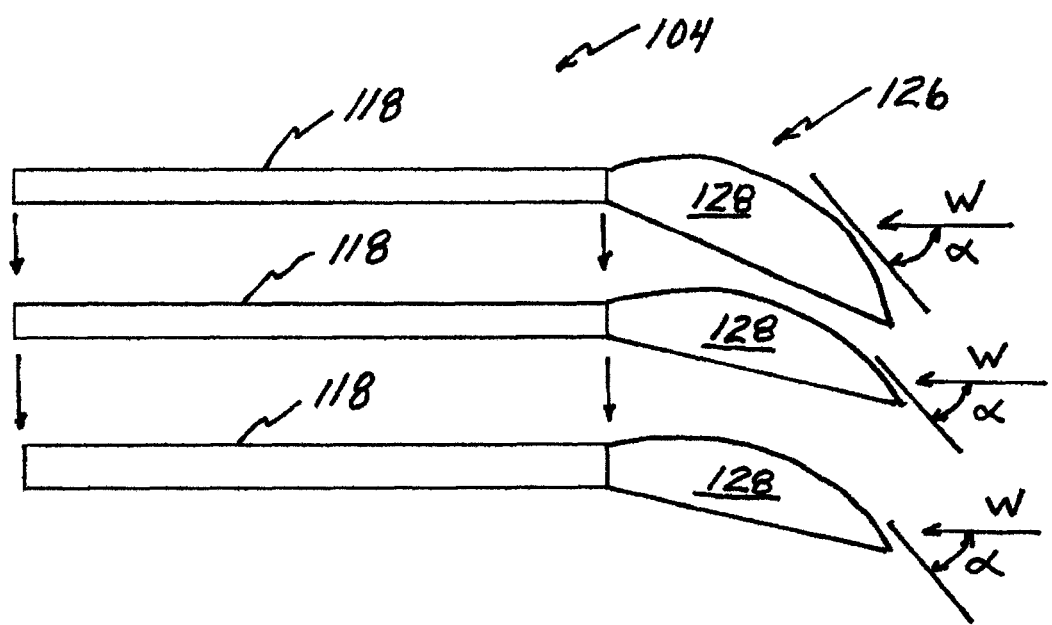
FIG. 6 is a top exploded schematic view of a blade showing individual scoop sections each having a different angle of incidence with respect to the wind.
Figure 7:
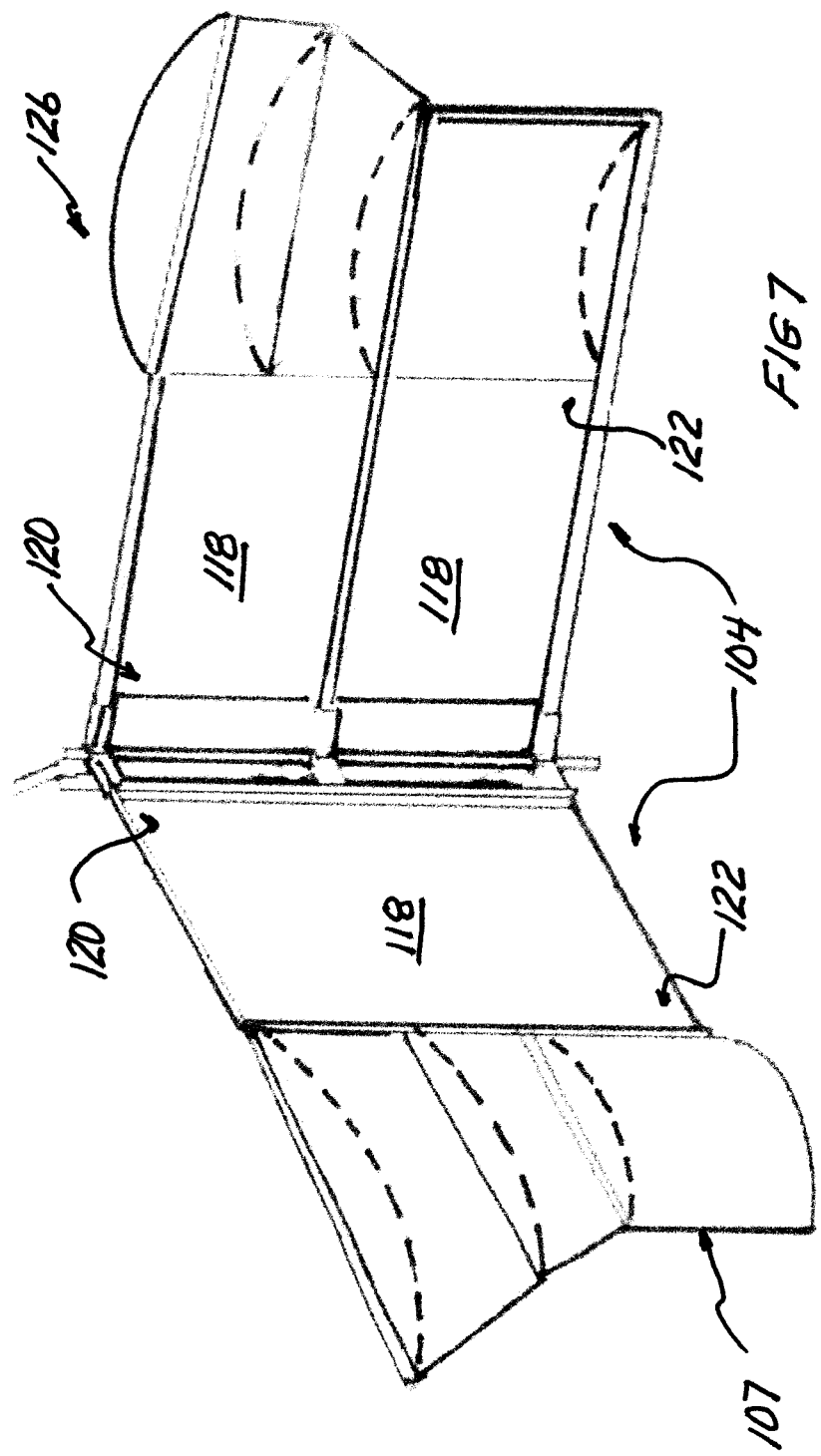
FIG. 7 is a perspective schematic view showing a rotor having supporting horizontal arms for supporting a plurality of blades, each blade having a first portion and a scoop portion with scoop sections, the rotor is shown having a vertical support and horizontal arms that support the individual blades.
Figure 8:
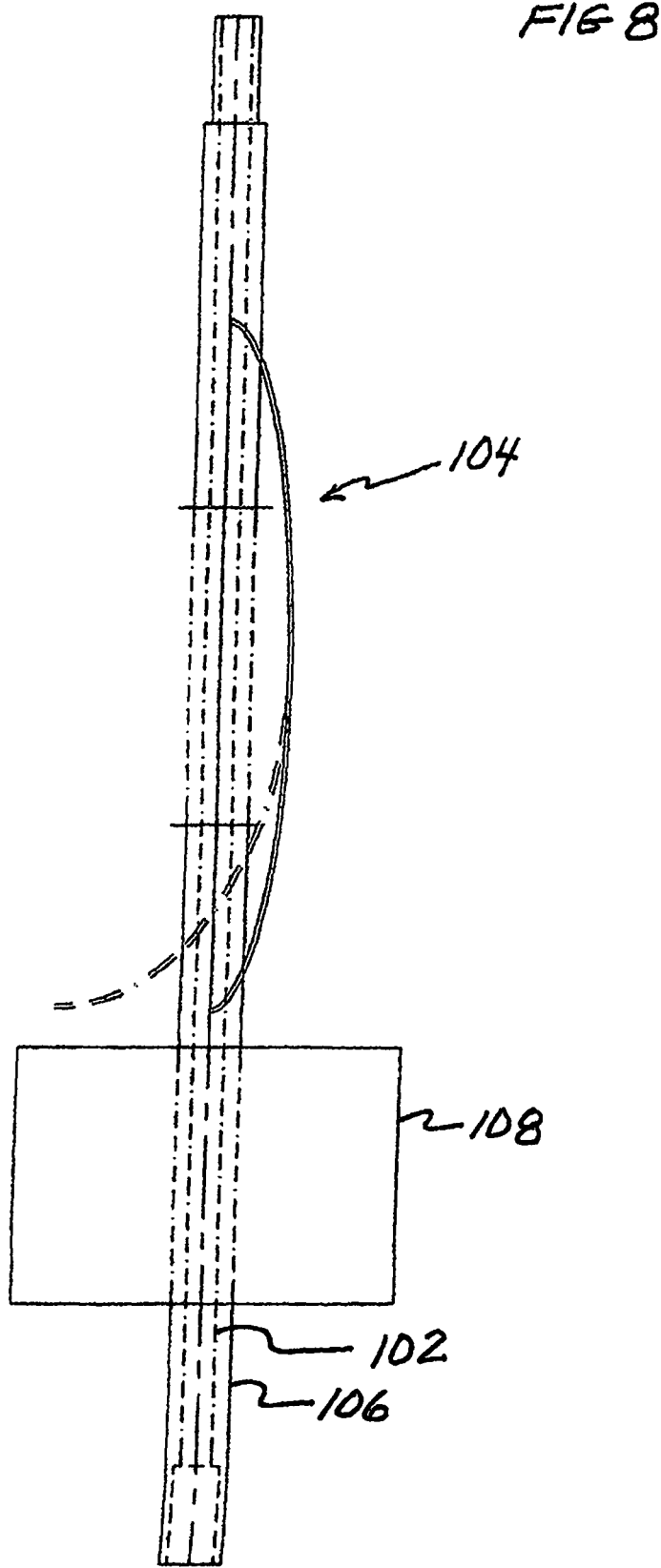
FIG. 8 is a schematic illustration of a blade having an aerodynamic adjustment element thereon that operates to increase or decrease the camber of the blades and/or the angle of incidence of the wind with respect to the scoop portion and showing a drive shaft connected to the rotor and to a generator for producing electrical power and showing a blade being acted upon by the aerodynamic adjustment element for changing the aerodynamic characteristics of the blade including the scoop portion.

Referring to FIGS. 2, 7 and 8, a preferred embodiment of the wind generator system, generally referred to as 100, is shown comprising a drive shaft 102 and one or more blades 104 attached to and extending radially outwardly from a rotor 106. The rotor 106 is coupled to a drive shaft 102 which is operationally coupled to a generator assembly 108 which operates to generate electrical power when actuated by rotation of the drive shaft 102 caused by the rotation of the rotor 106. It should be understood that as used herein the term "generator" includes alternators Referring to FIGS. 1, 2 and 4, each blade 104 is attached to the rotor 106 by horizontal support arms 110 mounted to a vertical support 112 of the rotor 106 which provide support for the blade 106. As shown in FIGS. 2 and 4, the rotor 106 and the drive shaft 102 are rotatably mounted, such as by bearings, to a wind generator support structure 114 that operates to secure the wind generator, such as to a base structure 116. As shown in FIG. 5, each blade 104 includes a first portion 118 having a distal end 120 for attaching to the vertical support 112 of the rotor 106 and a proximal end 122 attached to a biomimetic aerodynamic element 124 having a scoop portion 126 forming about one-third of the length of the blade L and having two or more individual scoop sections 128. Each individual scoop section 128 is formed such that in operation each scoop section will have an angle of incidence a (the angle of incidence of the individual scoop sections of the scoop portion 126 is shown in FIG. 6 to the wind (direction and amount of air flow being directed to a blade) W such that the lift of the blade 104 is increased (increasing the rotational force of the blade) while decreasing the drag of the blade 104. As shown, each blade 104 creates a varied geometry along the height H of the scoop portion 126. The change in in the angle of incidence to the wind at the individual scoop sections 128 increases the force produced by the blade 104 resulting from the overall hook and twist created by the adjacent individual scoop sections 128. It should now be apparent to one skilled in the art that the individual scoop sections 128 of the blades 104 of the invention creates a geometry that imitates the hook and twist of a wing of a bird and increases the horizontal and vertical lift created by each blade 104 thereby increasing the rotational force and torque on the rotor 106 and the drive shaft 102 while effectively reducing the drag forces on the individual blades 104. As illustrated in FIG. 7. it should also now be apparent to one skilled in the art that the outer surface 107 of the scoop portion 126 forms an aerodynamic surface that operates to increase the velocity of the air passing over the outer surface 107 thereby reducing pressure along the outer surface 107. Thus, the hook design of the scoop portion operates to increase pressure and force acting on the blade when the scoop portion is facing (receiving) air flow (wind) and decreases the pressure when the scoop portion is facing away from the air flow thereby decreasing drag and inducing laminar flow over the rounded outer surface of the scoop portion. As wind velocities increase this laminar flow will further induce a low-pressure area along the outer surface 107 further decreasing drag. At equilibrium, the stagnation pressures along the outer surface of the scoop portion will create a low vacuum environment and induce a vortex around the center of rotation or shaft.

Figure 9:
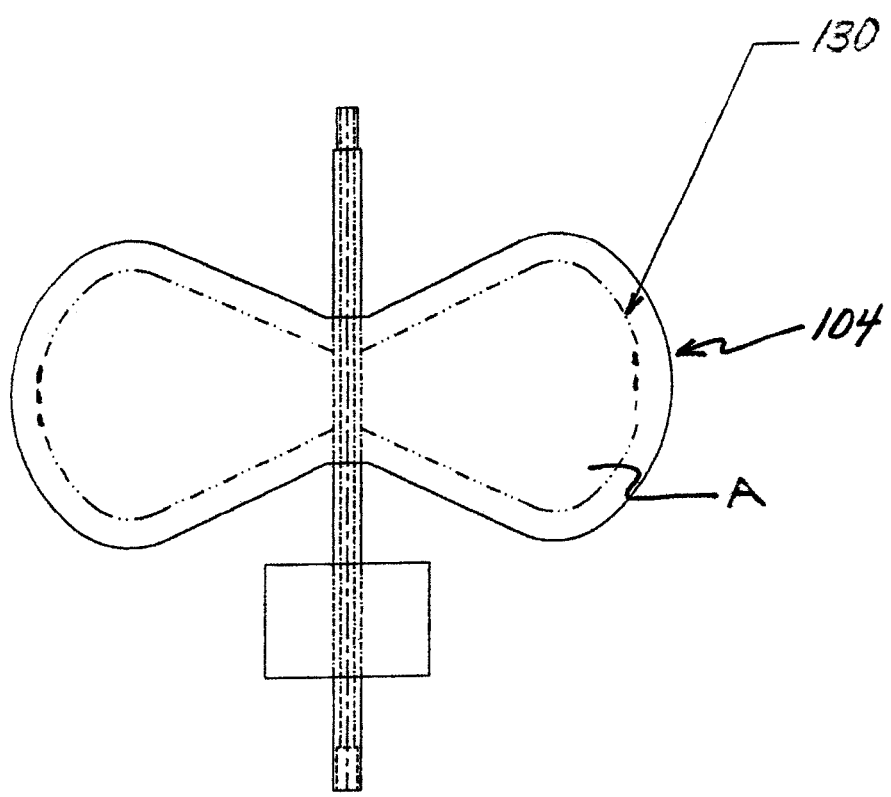
FIG. 9 is a side schematic illustration showing a blade having an aerodynamic adjustment element comprising a thin film material applied to a portion of one side of the blade.
Figure 10:
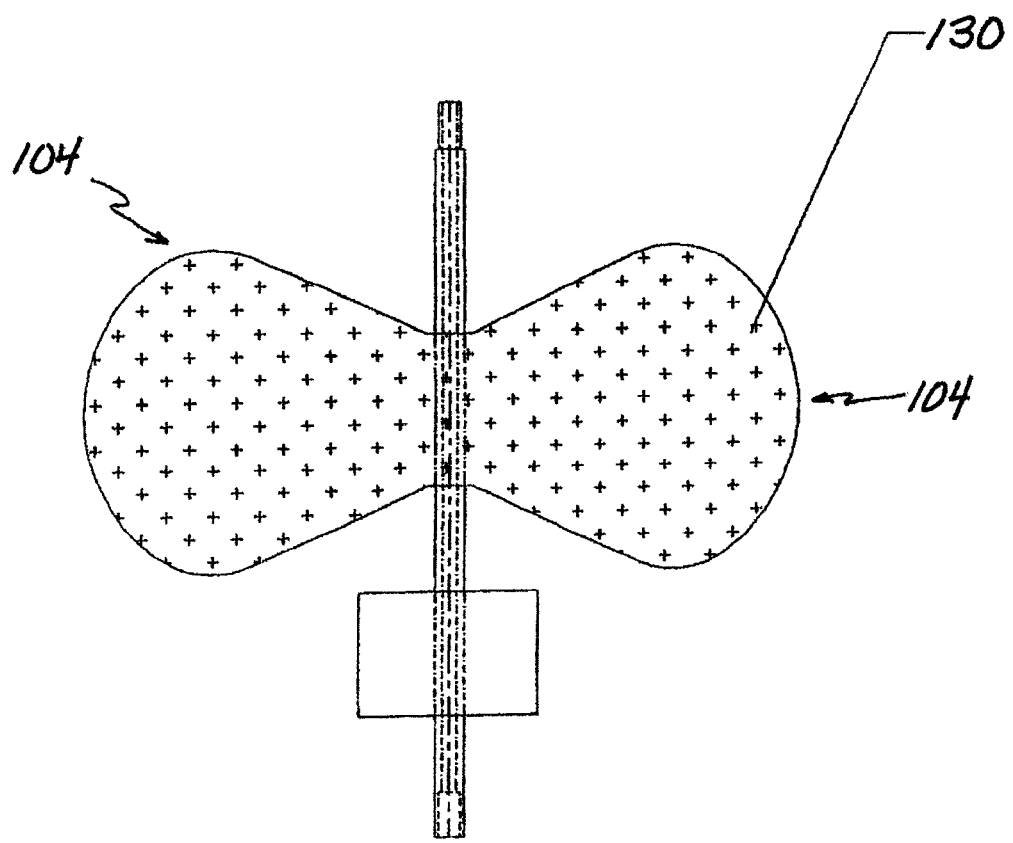
FIG. 10 is a schematic illustration showing blades having a piezo electric material coating applied to one or both sides of a blade.

Referring to FIGS. 9 and 10, each blade 104 has a relatively large surface area A effective for harvesting lower-energy (low wind speed) wind being directed to the blades. In a preferred embodiment of the invention, blades 104 are shown whereby each blade includes an aerodynamic adjustment element 130 for adjusting the aerodynamic characteristic of each of the blade and the scoop portion 126. In a preferred embodiment the aerodynamic adjustment element 130 is in the form of a thin film material or wire, such as a shaped memory material or functional material (FIG. 9), that operates to change the surface geometry of the blade and the scoop portion 126 by increasing or decreasing the angle of incidence the scoop portion 126 (and the individual scoop sections 128) of each blade 104 to adjust the aerodynamic characteristic of the blade 104 under a variety of wind speeds. It should be apparent to one skilled in the art that by changing the angle of incidence of each scoop section 128 of the scoop portion 126 allows for optimizing the efficiency of each blade 104. It is known that simple contraction of certain thin film materials can be accomplished such as by running electrical current through a functional material such as carbon fibers on a polyimide sheet. In a preferred embodiment, the aerodynamic adjustment element 130 is in the form of a shaped memory material (FIG. 9), such as Nitinol (NiTi) which is a shaped memory alloy having nearly equivalent amounts of nickel and titanium. The physical and mechanical properties of a shaped memory material, such as Nitinol are dependent on its crystalline structure. For example, the Nitinol crystal structure is very dynamic and highly heat sensitive and when it is deformed in the martensite phase, the crystalline structure is not damaged. Instead the crystal structure transforms moving in a singular crystalline direction. When heated the material returns to the memory or austenite phase, to a state of less stress. The austenite phase is the phase above transition temperature. The transition temperature will vary according to the material composition. Most Nitinol alloys, for example, have transition temperatures between 70-130° C. with tensile strength 100,000 psi, melting point of 1,250° C., and resistance 1.25 ohms per inch/0.006 inch wire. In a preferred embodiment, the particular Nitinol alloy found to be suitable is known as FLEXINOL, commercially available by Dynalloy Inc. of Costa Mesa, Calif. Using thin film materials along or through the surface of the blade (such as the scoop sections) allows the surface geometries of the blade to be adjusted to change the angle of incidence of the blade or the individual scoop sections. By adjusting the electrical current through the thin film material to bend the blade or the individual scoop sections to optimize the surface geometries and provide the optimization of the angle of incidence for the particular wind conditions.

Figure 11:
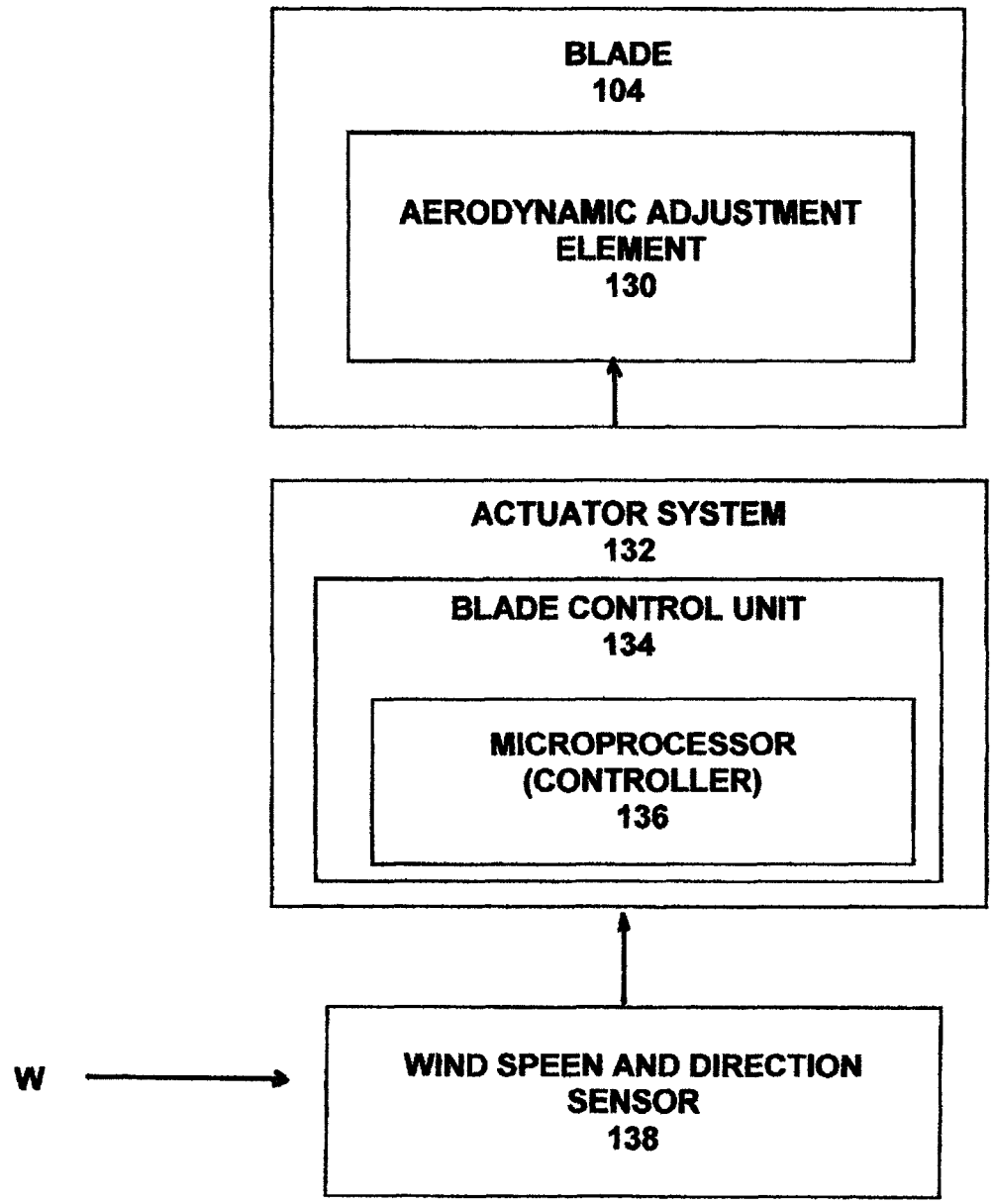
FIG. 11 is a schematic illustration showing the blade control unit and a resistant circuit for automatically activating the aerodynamic adjustment element to cause the blade to increase or decrease its camber thereby adjusting its aerodynamic characteristics in response to changes in the wind.

Preferably, as stated above, the aerodynamic adjustment element 130 may be in other forms such as embedded wire, thin film or a metallic coating. Referring to FIG. 10, in a preferred embodiment the aerodynamic adjustment element 130 is shown as a thin film material, such as a Nitinol, applied to a portion of one side of each blade 104. As shown, the blade is in its normal operating configuration. Upon heating of the aerodynamic adjustment element 130, such as by application of electric current through a resistant circuit, the aerodynamic adjustment element 130 contracts, as described above as well as in U.S. Pat. No. 8,648,481 issued Feb. 11, 2014, which is incorporated herein in its entirety. Such aerodynamic adjustment elements 130 when activated causes the bending of the blade 104 which increases or decreases the angle of incidence of the individual scoop sections 128 of the scoop portion 126 of each blade 104 thereby adjusting its aerodynamic characteristics of the blade. Referring to FIG. 11, the aerodynamic adjustment element 130 is connected to an actuator system 132 that operates, for example, to direct and control an amount of electrical current going to the aerodynamic adjustment element 130 to cause the aerodynamic adjustment element to bend the blade thereby changing the surface geometry of the blade and the aerodynamic characteristics of the blade and the scoop portion. The wind generator system 100 further comprises a blade control unit 134 that automatically operates to adjust the aerodynamic characteristics of the blade and the individual scoop sections in response to changes in the wind. In a preferred embodiment, the blade control unit 134 has a fuzzy logic microprocessor or controller 136 that receives wind speed input from a wind speed and direction sensor or anemometer 138 and uses such information for controlling the amount of electric current, thus heating or allowing to cool the aerodynamic adjustment element 130 to bend (or twist) the blade 104 thereby adjusting the angle of incidence of the wind for the individual scoop sections 128 of the scoop portion 126 (such as by heating the thin film material (or embedded wire) formed from the shape memory alloy) to automatically expand or contract to bend (or twist) the blade 104 to adjust the scoop portion 126 and place the individual scoop sections 128 into a desired aerodynamic configuration in response to changes in the wind. It should also be understood that the blade control unit 134 can also operate to adjust the aerodynamic characteristics of each blade and scoop portion such that advancing blades 104a (FIG. 4) have a minimal or a reduced amount of drag and retreating blades 104b (FIG. 4) have the maximum or an increase in lift, thereby increasing the operating efficiency of the wind generator.

It should also be apparent that in another preferred embodiment of the invention the aerodynamic adjustment element can be used to adjust the aerodynamic characteristics of the blades and/or the scoop portion of the blade to allow them to accommodate the high wind speed. It should be apparent that unlike many prior art systems, the wind generator system of the subject application can operate under a variety of wind conditions from small (low) wind to high wind conditions.

It should now be understood that the integration of biomimetic devices in a rotor increases the efficiency of VAWTs while maintaining structural strength, reliability and relatively low noise emissions is a significant challenge. The conventional type of rotor provides a simple single angle of incidence, simple arc scoop at the outer approximate third of the rotor to capture airflow generated by wind. The use of biomimetic devices such as wing hooks and twists to increase lift and decrease drag on the vertical axis rotors particularly Savonius type turbine offers unique accommodation to maintaining the advantages mechanically and in terms of safety and reliability over that of horizontal axis wind turbines or propeller systems. These biomimetic devices create a substantial different geometry from that of the conventional rotor. The biomimetic devices of the subject invention create a varied geometry along the height of the rotor scoop allowing for change of the angle of incidence of the scoop section from the bottom to the top of the scoop. This change of the angle of incidence to the wind of the individual scoop sections increases lift at the top and establishes a top hook and a twist through the adjacent section to the outer edge of the rotor scoop. The angle of incidence to the airflow of the wind is varied from the top to the bottom of the rotor through the scoop section inducing a geometry imitating that of a hook and twist on the wing of a bird or raptor. Thus, increasing the horizontal and vertical lift components whereby increasing force on the rotor and torque of the turbine. This effectively reduces drag on the advancing rotors.

Figure 12:
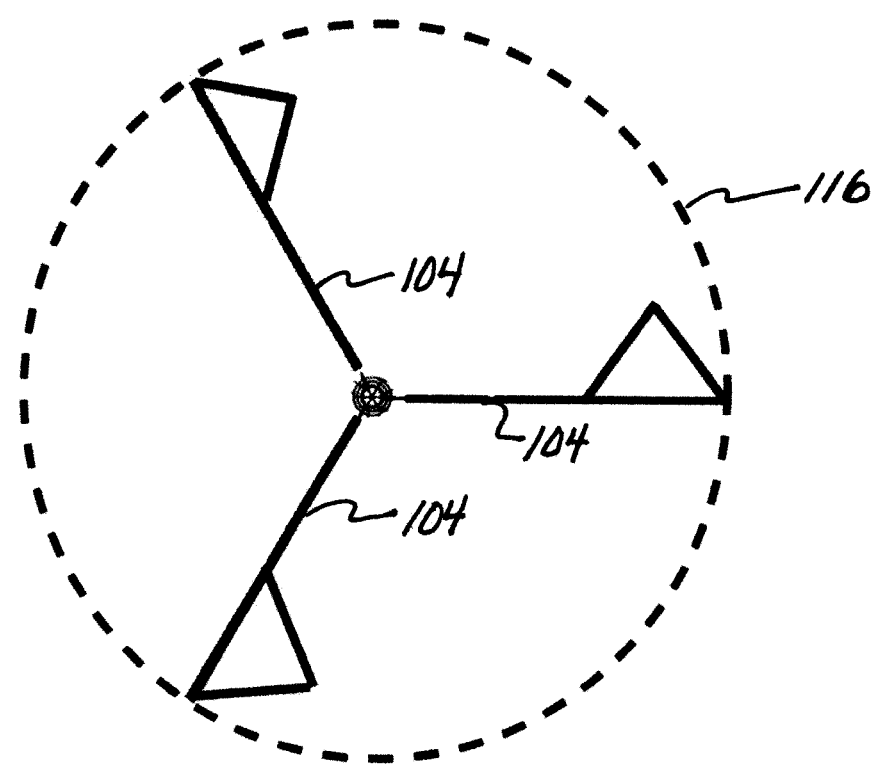
FIG. 12 is a schematic illustration showing a top down view if a disk or plate installed at the top of a rotor that operates to normalize wind flow along the blade and decreases buffering and turbulence and improving lift (torque) efficiency by capture of morel and wind components.
Figures 14A, 14B:
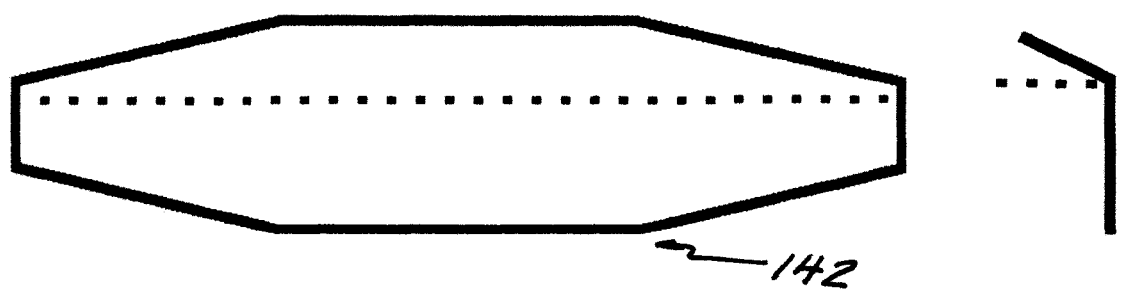
FIG. 14A is a schematic top view illustration showing a preferred configuration of an aerodynamic flap of FIG. 13.
FIG. 14B is an end view showing the aerodynamic flap of FIG. 14A.
Figures 15A, 15B:
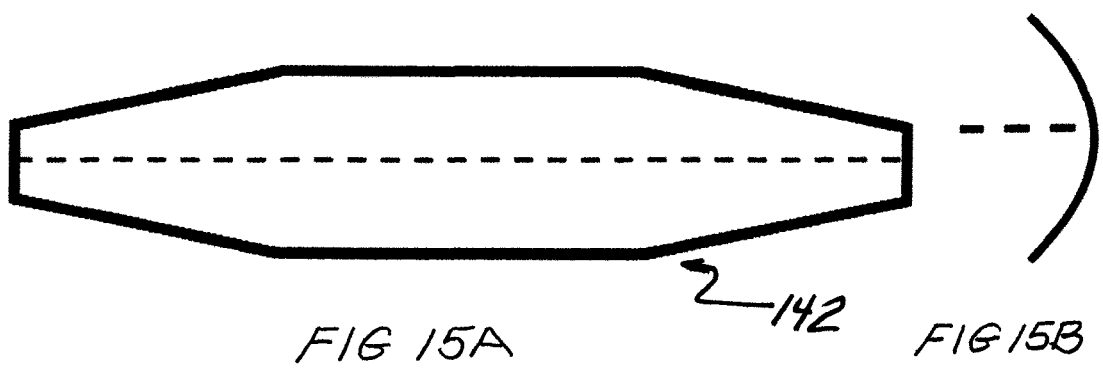
FIG. 15A is a schematic top view illustration showing another preferred configuration of an aerodynamic flap of FIG. 13.
FIG. 15B is an end view showing the aerodynamic flap of FIG. 15A.

Referring to FIGS. 2 and 12, the wind generation system 100 of the subject invention includes one or more blade sections 140 separated by base structures 116. It should now be understood to one skilled in the art that the base structures 116, are in the form of a disk or plate, operate to normalize air (wind) flow along the blades and decreases buffeting and turbulence thereby improving lift (torque) efficiency through capture of morel air (wind) components (Air or wind components are longitudinally along and across the blade as well as angular air or wind components). The use of base structures that attaches to the support structure 114 between the rotors 106 further increases the effectiveness of the aerodynamic torque enhancement devices 140 (as describe below) and also functions to all a reduction in the weight of the support structure by acting as a wind gust support preventing buckling of the horizontal and vertical supports thereby increasing reliability of the wind generator system and also aids in directing air flow into the individual scoop sections.

Figure 16A:
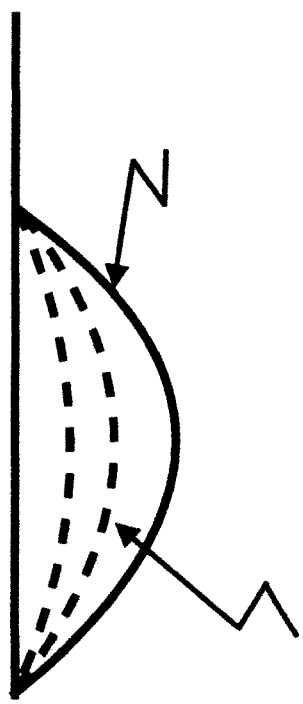
FIG. 16A is a schematic top view of a scoop having a rounded outer contour and with individual scoop sections within the scoop portion.
Figure 16B:
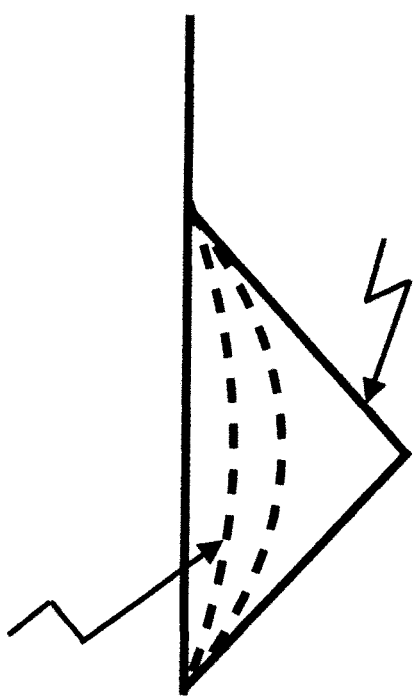
FIG. 16B is a schematic top view of a scoop having an angular outer contour and with individual scoop sections within the scoop portion.

Referring to FIGS. 13-15B another preferred embodiment of the subject is shown whereby the scoop portion 126 include one or more aerodynamic flaps 142 that form the scoop section 128. As shown, the scoop portion 126 of each blade 104 have inner walls 144 that have a rounded contour (FIGS. 15A, 15B and 16A) or a rectangular contour (FIGS. 12, 14A, 14B and 16B). It should now be understood that utilizing a rectangular (or angular) contour reduces manufacturing time and expense). Each aerodynamic flap 142 includes an upper surface 146 and a corresponding lower surface 148 that operate to capture air flow (wind) and increase air velocity within the scoop portion 126 thereby increasing the torque created by the scoop portion 126 as well as directing air upwardly along the sides of the aerodynamic flap further increasing the horizontal lift (torque) on the blade 104. It should now be understood to on skilled in the art that the scoop portion of the subject invention operates as a hook that captures air flow (wind), rather than simply operating as an aerodynamic blade creating high pressure on one side and low pressure on the other side, and creates an upward lift (torque) within the scoop portion. This novel geometry operates similar to the hook formed in a raptor wing that produces enhanced air capture elements, The scoop sections are a fixed limited twist geometry creating the hook providing a high-lift (high torque) element facing the air flow (wind) thus optimizing air capture and lift through a wind facing angle. The outer surface of the scoop portion also operates to reduce drag as the blade advances into the wind during rotation. Thus, the outer surface of the scoop portion acts independently of the scoop sections and creates low pressure long the outer surface which contributes to the amount of lift life (torque) being generated by the blades. Further, the outer surface of the operates in the induction of laminar flow around the rounded outer surface or fixed geometry scoops thereby reducing turbulent flow over the outer surface. Thus, the subject invention operates to produce high-lift (high torque) while reducing drag of an advancing blade.

Figure 18B:
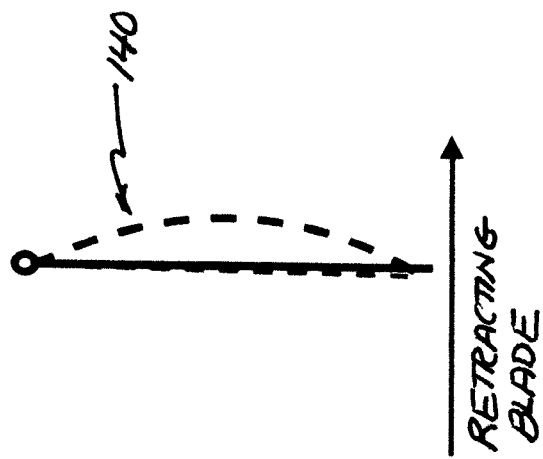
FIG. 18B is a side schematic view showing the adjusting aerodynamic lift apparatus of FIG. 17 showing it in its closed position when the blade is a retreating blade.
Figure 18A:
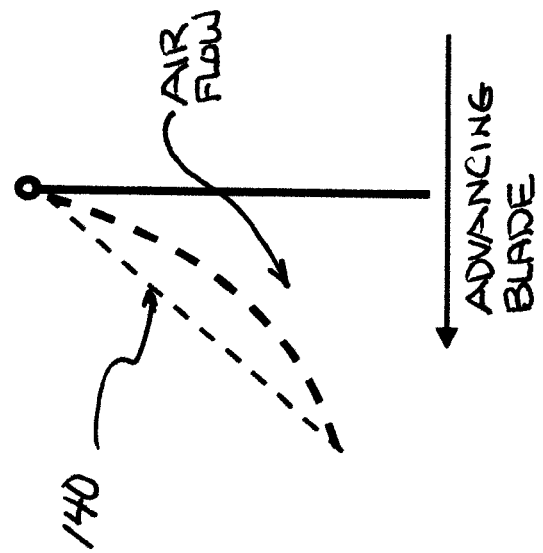
FIG. 18A is a side schematic view showing the adjusting aerodynamic lift apparatus of FIG. 17 showing it in its open position when the blade is an advancing blade.

In another preferred embodiment, as illustrated in FIGS. 17, 18A and 18B, the first portion 118 of each blade 104 is formed from a skinned or webbing, that is lighter than metal but having sufficient strength to withstand blade stresses encountered during use of the wind generator system, and includes one or more aerodynamic torque enhancement devices 140. Preferably, each aerodynamic torque enhancement device 140 has an outer aerodynamic contour that operates to increase air (wind) velocity traveling over the aerodynamic torque enhancement device and directing the air (wind) to the scoop portion 126 of the blade 104. In a preferred embodiment and as illustrated in FIGS. 18A and 18B, each aerodynamic torque enhancement device 140 is positioned over one or more openings 150 in the blade and is attached to the bade, such as by a pin or other apparatus, such as when the blade 104 is an advancing blade 104a the aerodynamic torque enhancement device 140 operates to expose the opening 150 thereby allowing air to move through the opening thereby reducing drag on the advancing blade (FIG. 18A) and further operates such when the blade is a retreating blade 104b the aerodynamic torque enhancement device 140 presses against the opening 150 thereby preventing air (wind) from passing through the opening 150.

Accordingly, the subject invention is directed to a wind generator system for generating electrical power from wind, the wind generator system comprising a rotor, a drive shaft connected to the rotor and to a generator for converting mechanical energy into electrical energy; and a plurality of blades attached to the rotor and extending radially outwardly therefrom. In a preferred embodiment each blade includes a first portion having a distal end for attaching to the rotor and a proximal end attached to a scoop portion with individual scoop sections. Each individual scoop section has an angle of incidence to the wind that operates to increase the lift of the blade while decreasing drag. In a preferred embodiment, each said scoop portion creates a hook and a twist such that the angle of incidence to the wind for each scoop section is varied along the scoop portion. In another preferred embodiment of the invention, the generator system includes an aerodynamic adjustment element operates to automatically adjust the aerodynamic characteristics of each blade by adjusting the aerodynamic characteristics of the scoop portion of each blade. In a preferred embodiment, the angle of incidence of each scoop section is varied to create a hook and a twist along the scoop portion. In a preferred embodiment, the aerodynamic adjustment element operates to automatically expand or contract to change the aerodynamic characteristics of the blade thereby changing the aerodynamic characteristics of the scoop portion in responses to changes in the wind. In a preferred embodiment of the invention the aerodynamic adjustment element is in the form of a thin film material that operates to expand or contract to change the aerodynamic characteristics of a blade and consequently the scoop portion in response to changes in the wind. In another preferred embodiment of the invention the aerodynamic adjustment element is in the form of a metallic composite coating that operates to expand or contract to change the aerodynamic characteristics of a blade and consequently the scoop portion in response to changes in the wind. In another preferred embodiment the aerodynamic adjustment element is in the form of a shaped memory material that operates to expand or contract to change the aerodynamic characteristics of a blade and consequently the scoop portion in response to changes in the wind. In a preferred embodiment of the invention the shaped memory material is Nitinol.

Although the foregoing invention has been described in some detail for purposes of clarity of understandings, it will be apparent that certain changes and modifications may be practiced within the scope of any claims. It should now be apparent that the various embodiments presented can be easily modified while keeping within the scope and spirit of the subject invention. Accordingly, it should be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A wind generator system for generating electrical power from wind, the wind generator system comprising:
    a rotor;
    a drive shaft connected to said rotor and to generator for converting mechanical energy into electrical energy; and
    a plurality of blades attached to said rotor and extending radially outwardly therefrom;
    wherein each blade includes a first portion extending radially outwardly from said rotor having a distal end attached to said rotor and a proximal end positioned radially outwardly from said distal end and attached to a scoop portion that extends radially outwardly from said proximal end and having at least two individual scoop sections;
    wherein said scoop portion has a hook and twist such that each individual scoop section has an angle of incidence to the wind that operates to increase the torque produced by said blade; and
    wherein said scoop portion has an outer surface that operates to increase the velocity of air passing over said outer surface that functions to decrease drag on said blade.

2. The wind generator system of claim 1 wherein each said scoop portion creates a hook and a twist such that the angle of incidence to the wind for each said scoop section is varied along said scoop portion.

3. The wind generator system of claim 1 wherein each said blade includes an aerodynamic adjustment element operates to adjust the aerodynamic characteristics of each said scoop section.

4. The wind generator system of claim 3 wherein said aerodynamic adjustment element operates to automatically adjust the aerodynamic characteristics of each said scoop section of each said blade in response to changes in the wind.

5. The wind generator system of claim 3 wherein said aerodynamic adjustment element is in the form of a thin film material that operates to expand or contract to change the aerodynamic characteristics of said scoop portion.

6. The wind generator system of claim 3 wherein said aerodynamic adjustment element is in the form of a metallic composite coating that operates to expand or contract to change the aerodynamic characteristics of said scoop portion.

7. The wind generator system of claim 3 wherein said aerodynamic adjustment element is in the form of a shaped memory material that operates to expand or contract to change the aerodynamic characteristics of said scoop portion.

8. The wind generator system of claim 7 wherein said shaped memory material is Nitinol.

9. The wind generator system of claim 1 wherein said scoop portion includes one or more aerodynamic flaps that operate to capture air flow and increase air velocity of the air flow within said scoop portion to increase torque created by said scoop portion.

10. The wind generator system of claim 1 wherein each said blade has at least one opening and an aerodynamic torque enhancement device positioned over said opening and wherein said aerodynamic torque enhancement device operates to direct air flow to said scoop portion when said blade is a retreating blade and operates to allow air to move through said opening when said blade is an advancing blade.

11. A wind generator system for generating electrical power from wind, the wind generator system comprising:
    a rotor;
    a drive shaft connected to said rotor and to generator for converting mechanical energy into electrical energy; and
    a plurality of blades attached to said rotor and extending radially outwardly therefrom, each blade having a scoop portion with one or more scoop sections, each scoop section operates to capture air and has an angle of incidence to the wind that varies along said scoop portion to increase lift of the blade while decreasing drag;
    wherein said scoop portion includes one or more aerodynamic flaps that operate to direct air flow to said scoop portion and to increase air velocity of the air flow within said scoop portion thereby increasing the amount of torque created by said scoop portion.

12. The wind generator system of claim 11 wherein each blade having an aerodynamic adjustment element that operates to automatically adjust the angle of incidence of each said one or more scoop sections in response to changes in the wind.

13. The wind generator system of claim 11 wherein each said blade has at least one opening and an aerodynamic torque enhancement device positioned over said opening and wherein said aerodynamic torque enhancement device operates to direct air flow to said scoop portion when said blade is a retreating blade and operates to allow air to move through said opening when said blade is an advancing blade.

14. The wind generator system of claim 11 wherein said aerodynamic adjustment element operates to expand or contract to change the aerodynamic characteristics of each said one or more scoop sections.

15. A wind generator system for generating electrical power from wind, the wind generator system comprising:
   a rotor;
   a drive shaft coupled to said rotor and to generator for converting mechanical energy into electrical energy; and
   a plurality of blades attached to said rotor and extending radially outwardly therefrom;
   wherein each blade includes a first portion having a distal end for attaching to said rotor and a proximal end attached to a scoop portion having one or more individual scoop sections;
   wherein each said one or more individual scoop sections has an angle of incidence to the wind that operates to increase the lift of said blade while decreasing drag;
   wherein each said blade has an aerodynamic adjustment element that operates to change the aerodynamic characteristics of each said blade to change the angle of incidence of said blade and each said one or more individual scoop sections with respect to the wind;
   wherein said scoop portion includes one or more aerodynamic flaps that operate to increase air velocity of the air flow within each scoop section of said scoop portion to increase torque created by said scoop portion; and
   wherein each said blade has at least one opening and an aerodynamic torque enhancement device positioned over said opening and wherein said aerodynamic torque enhancement device operates to direct air flow to said scoop portion when said blade is a retreating blade and operates to allow air to move through said opening when said blade is an advancing blade.

16. The wind generator system of claim 15 wherein the angle of incidence of each said one or more scoop sections are configured to create a hook and a twist along said scoop portion.

17. The wind generator system of claim 15 wherein said aerodynamic adjustment element operates to expand or contract to change the aerodynamic characteristics of said blade and each said one or more scoop sections.

* * * * *